(12) United States Patent
Sabia

(10) Patent No.: US 6,521,535 B2
(45) Date of Patent: Feb. 18, 2003

(54) INSITU OXIDATION FOR POLISHING NON-OXIDE CERAMICS

(75) Inventor: Robert Sabia, Big Flats, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/784,732

(22) Filed: Feb. 15, 2001

(65) Prior Publication Data

US 2002/0009887 A1 Jan. 24, 2002

Related U.S. Application Data

(60) Provisional application No. 60/186,415, filed on Mar. 2, 2000.

(51) Int. Cl.[7] .............................................. H01L 21/302
(52) U.S. Cl. ........................ 438/691; 438/692; 438/693
(58) Field of Search ................................ 438/691–693; 51/302, 307–310; 252/79.1–79.4

(56) References Cited

U.S. PATENT DOCUMENTS

| | | | | |
|---|---|---|---|---|
| 5,407,526 A | * | 4/1995 | Danielson et al. | 16/636 |
| 5,516,346 A | * | 5/1996 | Cadien et al. | 51/308 |
| 6,162,268 A | * | 12/2000 | Knapp et al. | 51/302 |
| 6,312,487 B1 | * | 11/2001 | Tanaka et al. | 51/309 |
| 6,336,945 B1 | * | 1/2002 | Yamamoto et al. | 51/309 |

OTHER PUBLICATIONS

H. Zhu, L.A.B. Tessarotto, V.A. Greenhut, D.E. Niesz & R. Sabia, Solvent and Abrasive Effects in Chemical Mechanical Polishing (CMP) of $Si_3N_4$, Ceramic Transactions vol. 102, pp. 259–268, 1999.

Walter L. Silvernail, Observations On Glass Polishing, Technical Digest of the 1982 OSA Workshop, Dec. 13–15, Palo Alto, Calif., pp. 1–6.

L. Bergstrom and M. Ernstsson, "The Effect of Wet and Dry Milling on the Surface Properties of Silicon Nitride Powders", Ceramics Today—Tomorrow's Ceramics, Elsevier Science Publishers B.V. 1991, pp. 1005–1014.

Lee M. Cook, "Chemical Processes In Glass Polishing", Journal of Non–Crystalline Solids, 120 (1990) pp. 152–171.

S. R. Hah & T. E. Fischer, "Tribochemical Polishing of Silicon Nitride", J. Electrochem. Soc., vol. 145, No. 5, May 1998, pp. 1708–1714.

Ming Jiang, R. Komanduri, On the finishing of $Si_3N_4$ balls for bearing applications, Wear 215 (1998), pp. 267–278.

Donald L. Feke, Stability and Rheology of Dispersions of Silicon Nitride and Silicon Carbide, NASA Contractor Report 179634, Jun. 1987, pp. 1–72.

* cited by examiner

*Primary Examiner*—Robert Kunemund
*Assistant Examiner*—Duy-Vu Deo
(74) *Attorney, Agent, or Firm*—Edward F. Murphy

(57) ABSTRACT

The invention includes a method of finishing a polycrystal silicon nitride surface. The method of finishing the polycrystal silicon nitride includes providing a polycrystal silicon nitride composite which includes a plurality of silicon nitride crystal grains and a glassy-phase grain boundary medium. The method further includes providing an abrading finishing mixture with the finishing mixture including an abrasive and an oxidant. The method includes concurrently oxidizing the silicon nitride grains and abrading the silicon nitride composite to provide a finished polycrystal silicon nitride surface.

52 Claims, 4 Drawing Sheets

INSITU OXIDATION FOR POLISHING NON-OXIDE CERAMICS

CROSS REFERENCE TO RELATED APPLICATIONS

This application claims the benefit of U.S. Provisional Application Serial No. 60/186,415, filed Mar. 2, 2000, entitled Insitu Oxidation For Polishing Non-Oxide Ceramics by Robert Sabia.

BACKGROUND OF THE INVENTION

Non-oxide ceramics such as silicon nitride ($Si_3N_4$), silicon carbide (SiC), aluminum nitride (AlN), boron carbide ($B_4C$), boron nitride (BN), and titanium carbide (TiC) are commercially important advanced ceramics for structural applications. Unlike, for example, the polishing of single crystal silicon nitride deposited on silicon (i.e., for microelectronic applications), the polishing of polycrystalline non-oxide ceramics are complicated by the physical properties of such material. For example, as a result of silicon nitride's high hardness the best finishing processes generate roughness greater than 20 angstroms. However, further improvements in surface quality are hindered by preferential polishing and the heterogeneous removal of glassy-phase grain boundary materials. This complication results in raised grains with respect to the grain boundary phase. This invention provides a means for hindering this heterogeneous polishing effect by oxidizing the non-oxide ceramic grains during polishing. This process provides a equal removal rate for materials across the entire surface (with insitu oxidation during polishing and homogeneous removal).

The present invention includes the polishing of non-oxide ceramics using a chemo-mechanical polishing abrasive such as cerium oxide or a mechanical abrasive such as aluminum oxide, pH adjusted using nitric acid. Specific to nitric acid is a high rate of oxidation of almost any non-oxide material. As a direct result of this property, nitric acid is commonly employed in conjunction with other acids for the post-polishing etching of materials such as silicon.

The process at hand may include a first-step polishing stage in which surface and subsurface damage remnant from lapping is removed using any number of abrasive materials (aluminum oxide, cerium oxide, etc.). The polishing step utilizing the insitu oxidizing solution preferably incorporates pH adjusting the polishing abrasive to pH 2–4 using high concentrations of nitric acid (0.1–1.0 molar concentrations).

SUMMARY OF THE INVENTION

One aspect of the present invention is a method of finishing a polycrystal silicon nitride surface. The method of finishing the polycrystal silicon nitride includes providing a polycrystal silicon nitride composite which includes a plurality of silicon nitride crystal grains and a glassy-phase grain boundary medium. The composite further includes providing an abrading finishing mixture with the finishing mixture including an abrasive and an oxidant. The method includes concurrently oxidizing the silicon nitride grains and abrading the silicon nitride composite to provide a finished polycrystal silicon nitride surface.

In another aspect, the present invention includes a method of forming a finished polycrystal silicon nitride surface. The method includes providing a polycrystal silicon nitride composite, which has a plurality of silicon nitride crystal grains and a glassy-phase grain boundary medium, and providing an abrading finishing mixture which has an abrasive and an oxidant. The method includes finishing the silicon nitride composite with the finishing mixture wherein the oxidant oxidizes the silicon nitride grains and the abrasive removes the glassy-phase medium and the oxidized silicon nitride grains wherein the resulting finished polycrystal silicon nitride surface has a roughness less than 10 angstroms.

In a further aspect the invention includes an abrasive finishing mixture for finishing a polycrystal composite having a glassy matrix and non-oxide crystal phases. Preferably the finishing mixture is a finishing slurry mixture. The finishing mixture is comprised of a plurality of abrasive particles and an oxidizer.

In another aspect the invention includes a method of polishing a non-oxide ceramic. The method of polishing includes providing a non-oxide ceramic comprised of a plurality of non-oxide crystals and a glassy phase boundary material. The method includes providing an abrasive finishing slurry mixture comprised of a plurality of abrasive particles and an oxidant, and finishing the non-oxide ceramic with the finishing slurry mixture to provide a polished surface.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

In accordance with the invention, the present invention for a method of finishing a polycrystal silicon nitride surface includes the step of providing a polycrystal silicon nitride composite. The provided composite includes a plurality of silicon nitride crystal grains and a glassy-phase grain boundary medium. The method includes providing an abrading finishing mixture which includes an abrasive and an oxidant. The method includes concurrently oxidizing the silicon nitride crystal grains and abrading the silicon nitride composite to provide a finished polycrystal silicon nitride surface.

Figure 1:
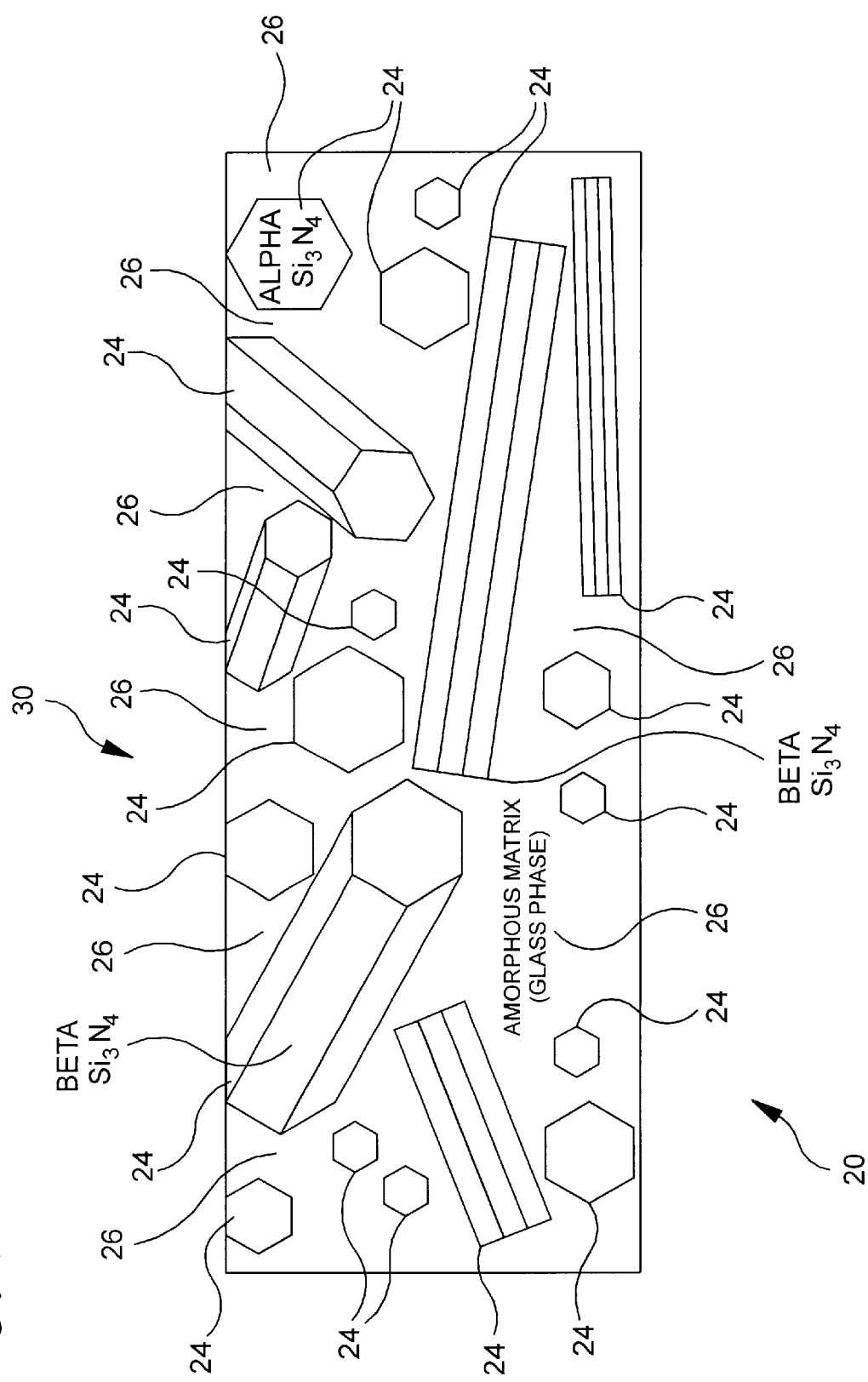
FIG. 1 illustrates an embodiment of the invention.
Figure 2:
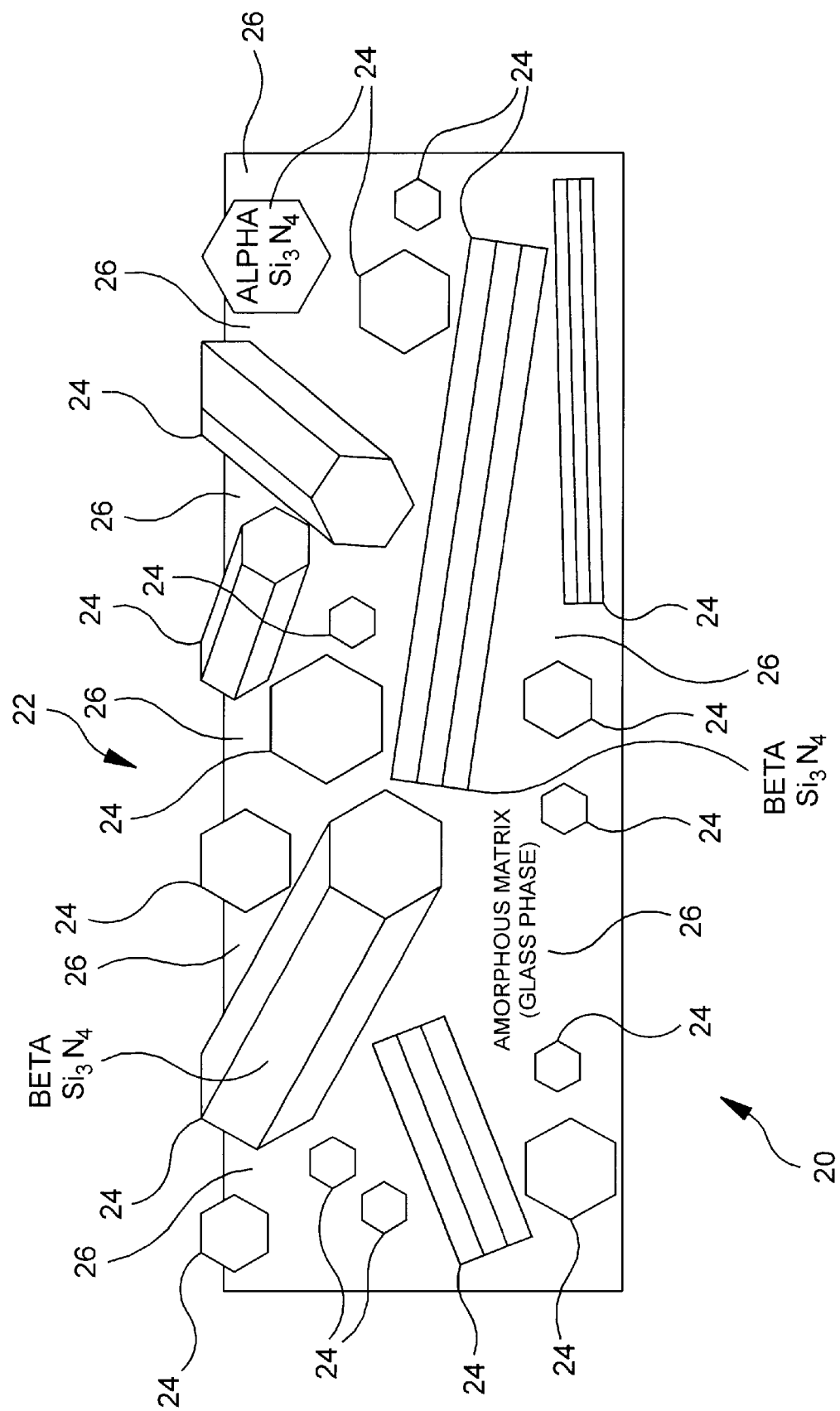
FIG. 2 illustrates preferential finishing of a non-oxide polycrystalline ceramic composite with a heterogeneous surface.

Polycrystal silicon nitride composites are shown in FIG. 1 and FIG. 2. FIG. 1 is a side cross-sectional view of a polycrystal silicon nitride composite finished and polished in accordance with the invention. FIG. 2 is a side cross-sectional view of a polycrystal silicon nitride composite, which illustrates the shortcomings of prior art methods of finishing polycrystal silicon nitride composites. The polycrystal silicon nitride composite 20 of FIG. 2 had a finished surface 22 which is uneven and degraded by the protrusion of silicon nitride crystal grains 24. Crystal grains 24 of FIG. 2 protrude from the surface 22 because of the preferential finishing removal of the glassy-phase grain boundary medium 26. The heterogeneous finished surface 22 of FIG. 2 results from the glassy-phase grain boundary medium 26 having a faster removal rate that the non-oxide silicon nitride crystal grains 24, which have a slower removal rate.

Figure 3:
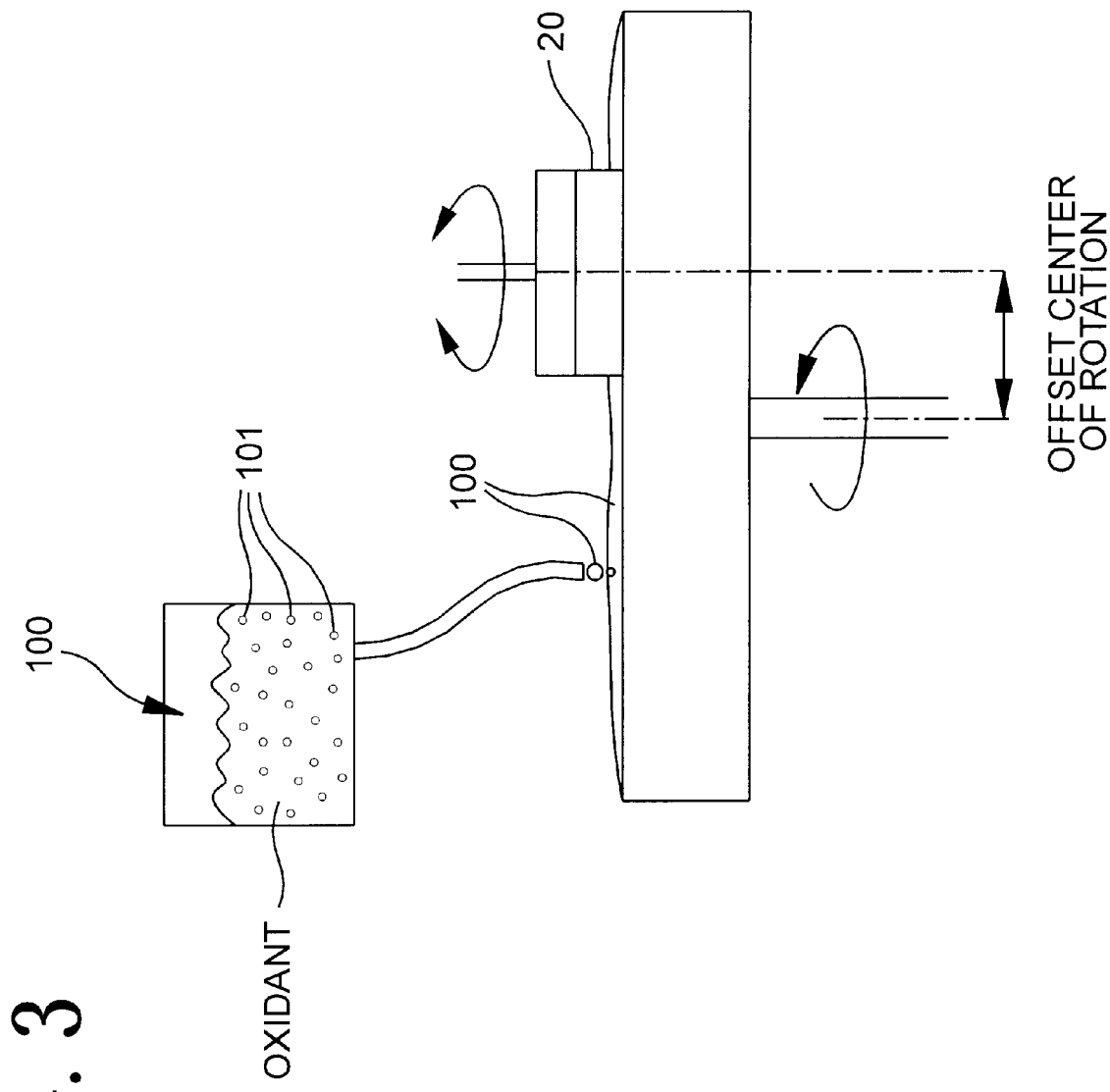
FIG. 3 illustrates an embodiment of the invention.
Figure 4:
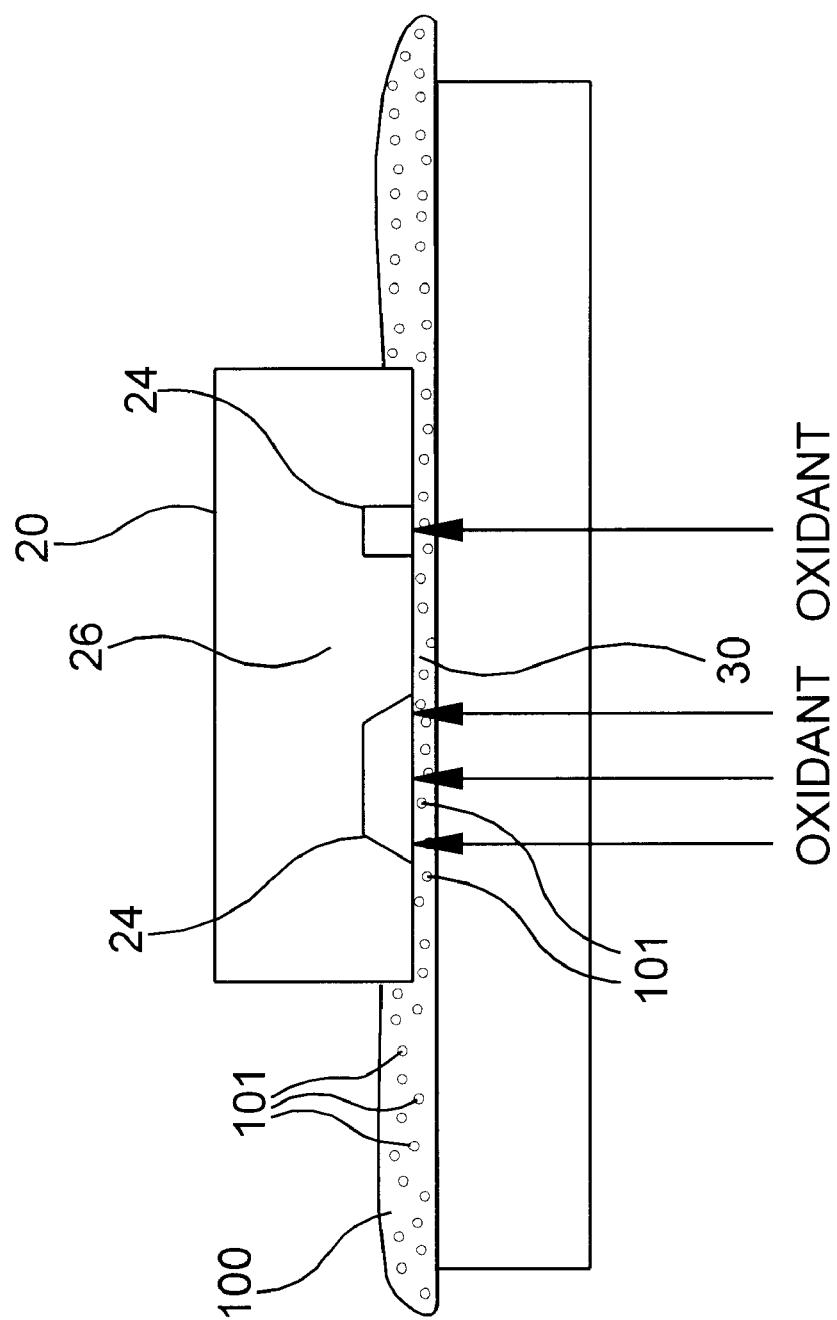
FIG. 4 illustrates an embodiment of the invention.

FIG. 1 illustrates a homogeneous finished polycrystal silicon nitride surface 30 in accordance with the invention. FIGS. 3 and 4 illustrate methods of the invention.

Provided polycrystal silicon nitride composite 20 includes a plurality of silicon nitride crystal grains 24 and a glassy-phase grain boundary medium 26. The method of finishing composite 20 includes providing an abrading finishing mixture 100 which includes an abrasive 101 and an oxidant, and concurrently oxidizing the silicon nitride crystal grains 24 and abrading the silicon nitride composite 20 to provide a finished polycrystal silicon nitride surface 30. Preferably the method includes removing silicon nitride crystal grains 24 and glassy-phase grain boundary medium 26 at a substantially equivalent removal rate wherein the finished polycrystal silicon nitride surface 30 has a surface roughness less than 10 angstroms with preferential removal of medium 26 inhibited. Preferably the method includes increasing the slower removal rate of silicon nitride crystal grains 24.

Preferably providing the abrading finishing mixture 100 includes providing an abrasive slurry which includes the abrasive particles 101 and the oxidant. Preferably the abrasive slurry is aqueous slurry.

The method includes abrading surface 30 to a surface roughness less than 20 angstroms, more preferably less than 10 angstroms, and most preferably $\leq 5$ angstroms.

In a preferred embodiment the provided finishing mixture oxidant comprises an oxidizing acid, with the oxidizing acid preferably being nitric acid. In a further embodiment the provided finishing mixture oxidant comprises an oxidizing salt preferably being a nitrate salt. Preferably the nitrate salt is at least one nitrate salt chosen from the nitrate salt group including aluminum nitrate, cerium ammonium nitrate, ferric nitrate, yttrium nitrate, and magnesium nitrate. In an embodiment of the invention the oxidant is comprised of both an oxidizing acid and an oxidizing salt.

Preferably the method includes breaking a plurality of Si to N bonds of the crystal grains with the oxidant. Preferably the method includes forming an oxygen-containing group from the crystal grains with the oxidant, preferably with broken Si to N bonds replaced by bonds to oxygen containing groups. The method includes abrading away the formed oxygen containing group complexes.

The invention includes forming a finished polycrystal silicon nitride surface 30. The method includes providing a polycrystal silicon nitride composite 20 which includes silicon nitride crystal grains 24 and a glassy-phase grain boundary medium 26; and providing an abrading finishing slurry mixture which includes an abrasive and an oxidant. The method includes finishing silicon nitride composite 20 with the mixture wherein the oxidant oxidizes the silicon nitride grains and the abrasive removes the glassy-phase medium and the oxidized silicon nitride grains such that the finished polycrystal silicon nitride surface 30 has a surface roughness less than 10 angstroms.

The invention further includes an abrasive polycrystal non-oxide ceramic composite finishing slurry mixture for finishing polycrystal composites, which have non-oxide crystal phases and a glassy matrix. The polycrystal non-oxide ceramic composite finishing mixture is comprised of a plurality of abrasive particles and an oxidizer. The finishing mixture provides for beneficial finishing of a polycrystal non-oxide ceramic composite 20.

Preferably the finishing mixture oxidizer is comprised of an oxidizing acid. Preferably the oxidizing acid is nitric acid. In a further embodiment the finishing mixture oxidizer is comprised of an oxidizing salt. Preferably the oxidizing salt is a nitrate salt. In an embodiment the oxidizer includes both an oxidizing acid and an oxidizing salt. Oxidizing nitrate salts of the invention include aluminum nitrate, yttrium nitrate, and magnesium nitrate. A further oxidant that can be utilized as an oxidizer in the practice of the invention is ferricyanide.

Preferably the finishing mixture is comprised of an aqueous water-based solution.

Preferably the finishing mixture has a pH in the range of 2 to 9, more preferably in the range of 2 to 7, and most preferably in the range of about 3 to 4.

The invention further includes a method of finish lap polishing a non-oxide ceramic. The method of polishing includes providing a non-oxide ceramic. The non-oxide ceramic 20 is comprised of a plurality of non-oxide crystals 24 and a glassy phase boundary material 26. The method includes providing an abrasive finishing slurry mixture which is comprised of a plurality of abrasive particles and an oxidant. The method includes finishing the non-oxidant ceramic 20 with the finishing slurry mixture to provide a polished surface 30.

The method of polishing non-oxide ceramic 20 includes oxidizing the non-oxide crystals 24 with the finishing slurry mixture oxidant and abrading the oxidized crystals with the abrasive particles.

Preferably the non-oxide crystals 24 have a high finishing removal hardness H and the glass phase boundary material 26 has a low finishing removal hardness L with H>L. Preferably the oxidant lowers the finishing removal hardness of crystals 24 so that it approaches that of amorphous glass phase 26. Preferably the non-oxide crystals 24 have a crystal abrasion resistance and the method includes lowering the crystal abrasion resistance. Preferably the method includes softening non-oxide crystals 24. Preferably the method includes forming a reaction layer on crystals 24 with the slurry mixture.

Preferably the oxidant includes an oxidizing acid, most preferably the oxidizing acid is comprised of nitric acid. In a further embodiment the oxidant includes an oxidizing salt, preferably a nitrate salt. In an embodiment the oxidant includes both an oxidizing acid and an oxidizing salt. The oxidizing salt is preferably comprised of aluminum nitrate, yttrium nitrate, magnesium nitrate, or a combination of these oxidizing nitrate salts.

Preferably the method includes finishing the ceramic 20 to a polished surface 30 having a surface roughness <20 angstroms RMS, more preferably <10 angstroms RMS, and most preferably $\leq 5$ angstroms RMS.

Preferably ceramic 20 includes silicon nitride. In a further embodiment ceramic 20 includes silicon carbide. In a further embodiment ceramic 20 includes aluminum nitride. In a further embodiment ceramic 20 includes boron carbide. In a further embodiment ceramic 20 includes boron nitride. In a further embodiment ceramic 20 includes titanium carbide.

Polycrystalline silicon nitride ($Si_3N_4$) is a ceramic composite most commonly utilized in structural applications for such fields as aircraft engines (bearing balls, bearing raceways, turbine blades, etc.). The composite is preferably manufactured by mixing colloidal apha-$Si_3N_4$ with sintering aids (e.g., MgO, $Al_2O_3$, $Y_2O_3$) into a paste or slurry, forming the mixture into a green body by such methods as slip casting or pressing, and sintering using a technique such as hot isostatic pressing (HIPing). The resulting microstructure is comprised of alpha-$Si_3N_4$ and beta-$Si_3N_4$ grains mixed in a glassy-phase grain boundary. The grain boundary is amorphous and consists of a mixture of the sintering aids and silica ($SiO_2$). The glassy-phase grain boundary is the byproduct of liquid-phase sintering process for forming the highly dense composite structure. With liquid phase sintering, the alpha grains dissolve in the molten glass matrix and precipitate to form the beta grains, which have a high aspect ratio and strengthen the composite. Sintering aids can be selected for the benefit of maximizing density, strength, and heat transfer properties.

For structural applications the silicon nitride sintered pre-form typically can only be manufactured to a near-net shape. Thus, a significant amount of materials is typically removed by means of grinding processes to form the final product. After what is commonly a series of grinding steps, non-destructive evaluation of the final product must be performed in order to ensure that the part does not exhibit flaws of critical size to cause failure upon application. The combination of grinding and post-grinding inspection commonly reflects 50–80% of the final part's cost.

The invention includes eliminating the preferential polishing problems of the prior art by the chemical reaction of the alpha and beta-$Si_3N_4$ grain surfaces with additive(s) in an aqueous-based polishing slurry to increase removal rate of the grains and result in a planar non-heterogeneous, final polished surface.

An abrasive slurry comprised of metal oxide abrasive particles (such as $SiO_2$, $Al_2O_3$, $Fe_2O_3$, $CeO_2$, $ZrO_2$, mixtures thereof) mixed to a solids loading between 3 and 20 weight percent in water (preferably de-ionized) is prepared. To the slurry is added an oxidizing acid (such as nitric acid), an oxidizing salt or salts (aluminum nitrate, cerium ammonium nitrate, ferric nitrate mixtures thereof), or a combination of oxidizing acid and salt(s). The resulting slurry comprises a pH value most desirably between 3–4, but can be across the ranges of pH 2–7 and pH 2–9 by means of adjustment with an appropriate alkaline solution (e.g., potassium hydroxide, ammonium hydroxide, etc.). Examples of slurry mixtures for both oxidizing acid addition and oxidizing salt addition are given below.

EXAMPLE

Oxidizing Slurry via Acid Addition

An abrasive slurry comprised of a metal oxide abrasive particle (e.g., $SiO_2$, $Al_2O_3$, $Fe_2O_3$, $CeO_2$, $ZrO_2$, etc.) mixed to a solids loading between 3 and 20 weight percent in water (preferably de-ionized) is prepared from either dry powders or purchased as a mixed slurry from a vendor, with an initial pH value between 2–11. Concentrated nitric acid (0.1–3.0 moles/liter) is added to the slurry in small quantities, thus reducing the slurry to a pH between 2–4. The slurry is then slightly oxidizing in comparison to the next example, and ready for polishing.

EXAMPLE

Oxidizing Slurry via Salt Addition

An abrasive slurry comprised of a metal oxide abrasive particle (e.g., $SiO_2$, $Al_2O_3$, $Fe_2O_3$, $CeO_2$, $ZrO_2$, etc.) mixed to a solids loading between 3 and 20 weight percent in water (preferably de-ionized) is prepared from either dry powders or purchased as a mixed slurry from a vendor, with an initial pH value between 2–11. To the slurry is added a concentrated solution of an oxidizing salt (e.g., aluminum nitrate, cerium ammonium nitrate, ferric nitrate, etc.), resulting in a final salt concentration of 0.1–3.0 moles/liter with a reduced pH below 2 and typically below 0. The nitrate-based salt is strongly acidic in nature. Using a base solution, the slurry can then be pH adjusted above to the range of pH 2–9, with the range of pH 3–4 most desirable. The slurry is highly oxidizing in comparison to the example given above. To maximize the oxidizing effect, the concentration of salt added is increased. To minimize contamination of alkaline or alkaline earth ions, ammonium hydroxide is preferably used for pH adjustment. Furthermore, the removal rate of the polishing slurry on the glass-phase grain boundary can be enhanced by the use of ferric-based or cerium-based nitrate salts (i.e., ferric nitrate or cerium ammonium nitrate).

The conventional reaction of silicon nitride grains with aqueous environments is as follows: Silicon nitride grains in a dry environment prior to being introduced to an aqueous-based polishing slurry have surfaces that include both primary (Si—$NH_2$) and secondary ($Si_2$—NH) surface amines. When placed in water, the silicon nitride surface can react to form free surface silanol groups (Si—OH). However, the further reaction of the bulk silicon nitride structure to interact with the aqueous system is extremely slow without the aid of increased temperature.

The oxidizing solution preferably polishes the polycrystalline silicon nitride composite as follows: When introduced to the oxidizing abrasive slurry, the silicon-to-nitrogen bonds from the primary and secondary amine surface groups and potentially the silicon-to-nitrogen-to-silicon bonds of the bulk structure are broken and thus allow reaction with the aqueous environment H+(H30+) and OH—. When interacting with the oxidizing slurry in this fashion, the alpha and beta grains that are on the surface form a surface reaction layer that is easily removed by abrasion of the abrasive particles. When the surface reaction layer is removed, fresh surface is introduced to solution and the reaction layer formation and subsequent removal re-occurs at a rate that approaches the removal rate of the glassy-phase grain boundary. Preferably, the overall surface is polished to form a planar surface without the heterogeneous rough structure exhibited in the prior art.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed:

1. A method of finishing a polycrystal silicon nitride surface, said method comprising:

providing a polycrystal silicon nitride composite, said polycrystal silicon nitride composite including a plurality of silicon nitride crystal grains and a glassy-phase grain boundary medium;

providing an abrading finishing mixture, having a pH of 2 to 7 said finishing mixture including an abrasive and an oxidant;

concurrently oxidizing said silicon nitride crystal grains and abrading said silicon nitride composite to provide a finished polycrystal silicon nitride surface.

2. A method as claimed in claim 1, said method including removing said silicon nitride crystal grains and said glassy-phase grain boundary medium at an equivalent removal rate wherein said finished polycrystal silicon nitride surface has a surface roughness less that 10 angstroms.

3. A method as claimed in claim 1, said method further including inhibiting a preferential removal rate of said glassy-phase medium.

4. A method as claimed in claim 1, said method further including increasing a removal rate of said silicon nitride crystal grains.

5. A method as claimed in claim 1, wherein providing an abrading finishing mixture comprises providing an abrasive slurry, said abrasive slurry including a plurality of abrasive particles and said oxidant.

6. A method as claimed in claim 1, wherein said composite is abraded to a surface roughness less than 10 angstroms.

7. A method as claimed in claim 1, wherein said oxidant includes an oxidizing acid.

8. A method as claimed in claim 1, wherein said oxidant includes ferricyanide.

9. A method as claimed in claim 7, wherein said oxidizing acid is nitric acid.

10. A method as claimed in claim 1, wherein said oxidant includes an oxidizing salt.

11. A method as claimed in claim 10, wherein said oxidizing salt is a nitrate salt.

12. A method as claimed in claim 1, wherein said oxidant is comprised of an oxidizing acid and an oxidizing salt.

13. A method as claimed in claim 1, further comprising breaking a plurality of Si to N bonds with said oxidant.

14. A method as claimed in claim 1, further comprising forming an oxygen containing group.

15. A method as claimed in claim 14, further including abrading away said formed oxygen containing group.

16. A method of forming a finished polycrystal silicon nitride surface, said method comprising:
providing a polycrystal silicon nitride composite, said polycrystal silicon nitride composite including a plurality of silicon nitride crystal grains and a glassy-phase grain boundary medium;
providing an abrading finishing mixture, having a pH of 2 to 7 said finishing mixture including an abrasive and an oxidant;
finishing said silicon nitride composite with said mixture wherein said oxidant oxidizes said silicon nitride grains and said abrasive removes said glassy-phase medium and said oxidized silicon nitride grains wherein
said finished polycrystal silicon nitride surface has a surface roughness less than 10 angstroms.

17. A method of polishing a non-oxide ceramic, said method comprising:
providing a non-oxide ceramic, said ceramic comprised of a plurality of non-oxide crystals and a glassy phase boundary material,
providing an abrasive finishing slurry mixture, having a pH of 2 to 7 said finishing slurry mixture comprised of a plurality of abrasive particles and an oxidant,
finishing said non-oxide ceramic with said finishing slurry mixture to provide a polished surface.

18. A method as claimed in claim 17, further comprising oxidizing said non-oxide crystals with said finishing slurry mixture oxidant and abrading said oxidized crystals with said abrasive particles.

19. A method as claimed in claim 17, wherein said non-oxide crystals have a high finishing removal hardness H and said glass phase boundary material has a low finishing removal hardness L with H>L.

20. A method as claimed in claim 17, said non-oxide crystals having a crystal abrasion resistance, said method including lowering said crystal abrasion resistance.

21. A method as claimed in claim 17, said method including softening said non-oxide crystals.

22. A method as claimed in claim 17, said method including forming a reaction layer on said crystals with said slurry mixture.

23. A method as claimed in claim 17, wherein said oxidant lowers the finishing removal hardness of said crystals.

24. A method as claimed in claim 17, wherein said oxidant includes an oxidizing acid.

25. A method as claimed in claim 24, wherein said oxidizing acid is comprised of nitric acid.

26. A method as claimed in claim 17, wherein said oxidant includes an oxidizing salt.

27. A method as claimed in claim 26 wherein said oxidizing salt is comprised of a nitrate salt.

28. A method as claimed in claim 26, wherein said oxidizing salt comprises aluminum nitrate.

29. A method as claimed in claim 26, wherein said oxidizing salt comprises yttrium nitrate.

30. A method as claimed in claim 26, wherein said oxidizing salt comprises magnesium nitrate.

31. A method as claimed in claim 17, wherein said oxidant includes an oxidizing acid and an oxidizing salt.

32. A method as claimed in claim 17, wherein finishing the ceramic includes finishing said ceramic to a polished surface having a surface roughness <20 angstroms RMS.

33. A method as claimed in claim 17, wherein finishing the ceramic includes finishing said ceramic to a polished surface having a surface roughness $\leq 5$ angstroms RMS.

34. A method as claimed in claim 17, wherein said ceramic includes silicon nitride.

35. A method as claimed in claim 17, wherein said ceramic includes silicon carbide.

36. A method as claimed in claim 17, wherein said ceramic includes aluminum nitride.

37. A method as claimed in claim 17, wherein said ceramic includes boron carbide.

38. A method as claimed in claim 17, wherein said ceramic includes boron nitride.

39. A method as claimed in claim 17, wherein said ceramic includes titanium carbide.

40. A method as claimed in claim 17, wherein said abrasive particles comprise a metal oxide.

41. A method as claimed in claim 17, wherein said abrasive particles comprise $SiO_2$.

42. A method as claimed in claim 17, wherein said abrasive particles comprise $Al_2O_3$.

43. A method as claimed in claim 17, wherein said abrasive particles comprise $Fe_2O_3$.

44. A method as claimed in claim 17, wherein said abrasive particles comprise $CeO_2$.

45. A method as claimed in claim 17, wherein said abrasive particles comprise $ZrO_2$.

46. A method as claimed in claim 17, wherein said oxidant includes ferricyanide.

47. A method as claimed in claim 1, said abrading finishing mixture having a pH of 2 to 4.

48. A method as claimed in claim 1, said abrading finishing mixture having a pH in the range of about 3 to 4.

49. A method as claimed in claim 16, said abrading finishing mixture having a pH of 2 to 4.

50. A method as claimed in claim 16, said abrading finishing mixture having a pH in the range of about 3 to 4.

51. A method as claimed in claim 17, said abrading finishing mixture having a pH of 2 to 4.

52. A method as claimed in claim 17, said abrading finishing mixture having a pH in the range of about 3 to 4.

* * * * *